US008559742B2

(12) United States Patent
Richter

(10) Patent No.: US 8,559,742 B2
(45) Date of Patent: Oct. 15, 2013

(54) IMAGE ENCODING METHODS AND APPARATUS PROVIDING IMPROVED VISUAL RESULTS

(75) Inventor: Thomas Richter, Stuttgart (DE)

(73) Assignee: Accusoft Corporation, Tampa, FL (US)

( * ) Notice: Subject to any disclaimer, the term of this patent is extended or adjusted under 35 U.S.C. 154(b) by 1040 days.

(21) Appl. No.: 12/576,874

(22) Filed: Oct. 9, 2009

(65) Prior Publication Data

US 2010/0092099 A1  Apr. 15, 2010

Related U.S. Application Data

(60) Provisional application No. 61/104,638, filed on Oct. 10, 2008.

(51) Int. Cl.
G06K 9/36 (2006.01)
G06K 9/46 (2006.01)

(52) U.S. Cl.
USPC .......................................... 382/250; 382/248

(58) Field of Classification Search
USPC ........................ 382/166, 240, 248, 250, 251
See application file for complete search history.

(56) References Cited

U.S. PATENT DOCUMENTS 5,416,604 A * 5/1995 Park ............................... 382/232
6,249,546 B1 * 6/2001 Bist ........................... 375/240.03
2002/0066019 A1 * 5/2002 Amonou et al. .............. 713/176
2006/0155531 A1 * 7/2006 Miller ........................... 704/219
2006/0293884 A1 * 12/2006 Grill et al. ..................... 704/219

OTHER PUBLICATIONS

Schonberg et al. ("Techniques for enhancing JPEG XR / HD Photo rate-distortion performance for particular fidelity metrics," Proc. SPIE 7073, Applications of Digital Image Processing, Sep. 15, 2008).*
Zeng et al., "Point-wise extended visual masking for JPEG-2000 Image Compression", IEEE Proc. of Intl. Conference on Image Processing, vol. 1, pp. 657-660, (2000).
Taubman, "High Performance Scalable Image compression with Ebcot", Proceedings of the IEEE Intl. Conf. on Image Processing, vol. 3, pp. 344-348, 1999.
Watson et al., "Visibility of Wavelet Quantization Noise", IEEE Transactions on Image Processing, vol. 6, No. 8, pp. 1164-1175, Aug. 1997.

(Continued)

Primary Examiner — Yubin Hung
(74) Attorney, Agent, or Firm — Straub & Pokotylo; Michael P. Straub; Stephen T. Straub

(57) ABSTRACT

Microsoft's recently proposed new image compression codec JPEG XR is currently undergoing ISO standardization as JPEG-XR. Even though performance measurements carried out by the JPEG committee indicated that the PSNR performance of JPEG XR is competitive, the visual performance of JPEG XR showed notable deficits, both in subjective and objective tests. This paper introduces various techniques that improve the visual performance of JPEG XR without leaving the current codestream definition. Objective measurements performed by the author indicate that the modified encoder, while staying backwards compatible to the current standard proposition, improves visual performance significantly, and the performance of the modified encoder is similar to JPEG.

19 Claims, 6 Drawing Sheets

(56) References Cited

OTHER PUBLICATIONS

Mazzarri et al., "Perceptual Embedded Image Coding Using Wavelet Transforms", Proc. IEEE Intl. Conference Image Processing, vol. 1, pp. 586-589, 1995.

Hontsch et al., "APIC: Adaptive Perceptual Image Coding Based on Subband Decomposition with Locally Adaptive Perceptual Weighting", Proc. of Intl. Conf. on Image Proc. 1997, vol. 1, pp. 37-40, 1997.

Chou et al., "A Perceptually Tuned Subband Image Coder Based on the Measure of Just-Noticeable-Distortion Profile", IEEE Transactions on Circuits and Systems for Video Technology, vol. 5, No. 6, pp. 467-476. Dec. 1995.

Ferwerda et al., "A Model of visual Masking for Computer Graphics", Proc. SIGGRAPH '97, pp. 143-152, 1997.

Mallat, "A Theory for Multiresolution Signal Decomposition: The Wavelet Representation", IEEE Transactions on Pattern Analysis and Machine Intelligence, vol. 11, No. 7, pp. 674-693, Jul. 1989.

Sharifi et al., "Estimation of Shape Parameter for Generalized Gaussian Distributions in Subband Decompositions of Video", IEEE Transactions on Circuits and Systems for Video Technology, vol. 5, No. 1, pp. 52-56, Feb. 1995.

Wang et al., "Image Quality Assessment: From Error Visibility to Structural Similarity", IEEE Transactions on Image Processing, vol. 13, No. 4, pp. 600-612. Apr. 2004.

Wang et al., "Multi-Scale Structural Similarity for Image Quality Assessment", IEEE Asilomar Conference on Signals, Systems and Computers, pp. 1398-1402, 2003.

Grottke et al., "Apriori Rate Allocation in Wavelet-based Image Compression", Proc. of AXMEDIX 2006, pp. 329-336, 2006.

Wu et al., "Rate-Constrained Picture-Adaptive Quantization for JPEG Baseline Coders", ICASSP-93, vol. 5, pp. V-389-V392, 1993.

Taubman, "High Performance Scalable Image Compression with EBCOT", IEEE Transactions on Image Processing, vol. 9, No. 7, pp. 1158-1170, 2000.

Daly, "Application of a noise-adaptive contrast sensitivity function to image data compression", SPIEE, vol. 29, No. 8, pp. 977-987, Aug. 1990.

N. Otsu, "A Threshold Selection Method from Gray-Level Histograms", IEEE Transactions on Systems, Man, and Cybernetics, vol. SMC-9, No. 1, pp. 62-66, Jan. 1979.

R.M. Haralick, S.R. Sternberg, X. Zhuang, "Image Analysis Using Mathematical Morphology", IEEE Transactions on Pattern Analysis and Machine Intelligence, vol. PAMI-9, No. 4, pp. 532-550, Jul. 1987.

S.R. Sternberg, "Grayscale Morphology", Computer Vision, Graphics and Image Processing, vol. 35, No. 3, pp. 333-355, Sep. 1986.

A. Morales, R. Acharya, and S.J. Ko, "Morphological Pyramids with Alternating Sequential Filters", IEEE Transactions on Image Processing, vol. 4, No. 7, pp. 965-977, Jul. 1995.

J. Gil and R. Kimmel, "Efficient Dilation, Erosion, Opening, and Closing Algorithms", IEEE Transaction on Pattern Analysis and Machine Intelligence, vol. 24, No. 12, pp. 1606-1617, Dec. 2002.

J. Gil and M. Werman, "Computing 2-D Min, Median, and Max Filters", IEEE Transaction on Pattern Analysis and Machine Intelligence, vol. 15, No. 5 pp. 504-507, May 1993.

D.S. Bloomberg, "Multiresolution Morphological Approach to Document Image Analysis", ICDAR, pp. 1-12, 1991.

Y.M.Y. Hasan and L.J. Karam, "Morphological Text Extraction from Images", IEEE Transactions on Image Processing, vol. 9, No. 11, pp. 1978-1983, Nov. 2000.

M. Cumplido, P. Montolio, and A. Gasull, "Morphological Preprocessing and Binarization for OCR Systems", in Mathematical Morphology and Its Applications to Signal Processing, P.A. Margos, R.W. Schafer, and M.A. Butt, Eds., pp. 393-400, Springer, 1996.

I. Pitas, "Fast Algorithms for Running Ordering and Max/Min Calculation", IEEE Transactions on Circuits and Systems, vol. 36, No. 6, , pp. 795-804, Jun. 1989.

E. Urbach and M. Wilkinson, "Efficient 2-D Grayscale Morphological Transformations With Arbitrary Flat Structuring Elements", IEEE Transactions on Image Processing, vol. 17, No. 1, pp. 1-8, Jan. 2008.

\* cited by examiner

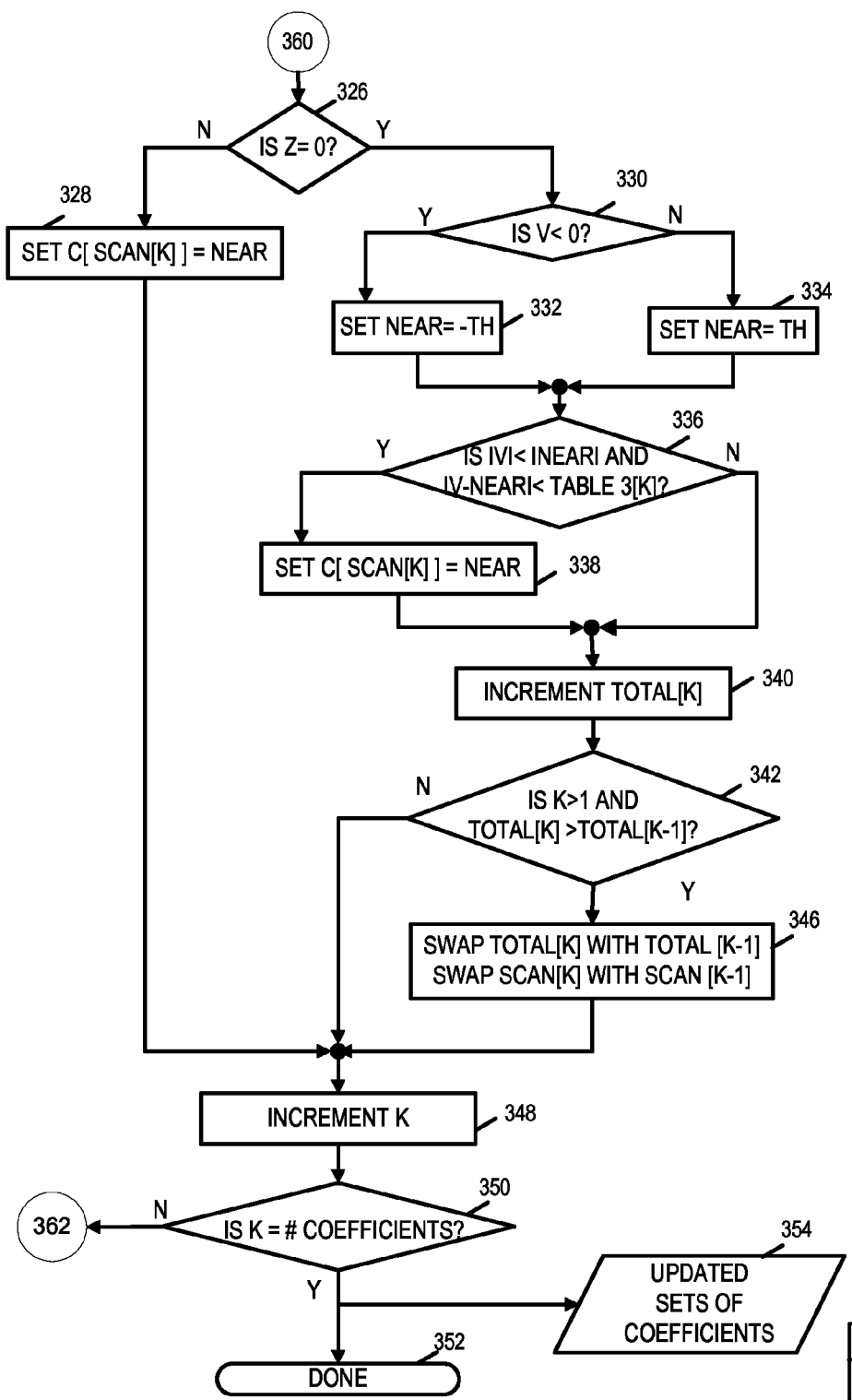

| 0 | 0 | 2 | 0 | 0 | 1 | 2 | 0 | 1 | 4 | 5 | 2 | 2 | 5 | 6 |
|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 |

TABLE 1

FIG. 5

| 0 | 1 | 3 | 0 | 0 | 2 | 5 | 1 | 2 | 10 | 15 | 3 | 5 | 15 | 20 |
|---|---|---|---|---|---|---|---|---|----|----|---|---|----|----|
| 1 | 2 | 3 | 4 | 5 | 6 | 7 | 8 | 9 | 10 | 11 | 12 | 13 | 14 | 15 |

TABLE 2

FIG. 6

| 0 | 0 | 2 | 0 | 0 | 1 | 2 | 0 | 1 | 4 | 5 | 2 | 2 | 5 | 6 |
|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 |

TABLE 3

FIG. 7

IMAGE ENCODING METHODS AND APPARATUS PROVIDING IMPROVED VISUAL RESULTS

RELATED APPLICATIONS

The present application claims the benefit of U.S. Provisional Patent Application Ser. No. 61/104,638 filed on Oct. 10, 2008 and titled "VISUAL QUALITY IMPROVEMENT TECHNIQUES OF JPEG XR/JPEG-XR" which is hereby expressly incorporated by reference in its entirety.

FIELD

Various embodiments relate to image processing and, more particularly, image encoding methods and apparatus.

BACKGROUND

Microsoft approached the SC29/WG1 ISO committee, better known as the "JPEG" committee, in Spring 2007 answering the open call for Advanced Image Coding and provided their HDPhoto compression scheme, now publicly known as JPEG XR, for standardization. Performance measurements were carried out by the committee. Similar tests have been run outside the JPEG as well. Various tests measured both objective performance, using MSE, SSIM, M-SSIM, VDP and subjective performance using ordering tests. The test results indicated consistently that while the Mean Square Error (MSE) of JPEG XR is close to JPEG2000 and appears competitive, the actual human perceived visual performance of the proposed encoder was not competitive, and even below or only close to traditional JPEG. Reasons for this are found in the codec design, which is PSNR optimal, but not visually optimal.

JPEG XR is very much like traditional JPEG. JPEG XR is a block-based design, and follows the traditional design principles found in many image compression schemes. That is, first, a linear decorrelation transformation removes redundancies in the input data, followed by a quantization procedure that removes irrelevant data. The symbols generated by the quantizer are then entropy-coded.

While JPEG uses a classical 8×8 DCT and JPEG2000 a discrete wavelet transformation, JPEG XR employs a 4×4 orthogonal overlapped block transformation. The 15 high-pass coefficients of a block form the so-called AC band, whereas the DC coefficients of 16 neighboring blocks are recursively transformed again with the same transformation, resulting in 15 lowpass coefficients forming the LP band, and one DC coefficient in the DC band. All three bands are then quantized with a scalar deadzone quantizer. Even though quantization bucket sizes can be tuned for each of the three bands, all coefficients within in each band share the same quantization parameter, regardless of the spatial frequencies they represent.

The quantization parameters are, however, adjustable on a block by block basis. The quantization symbols are then represented in binary notation of which the high-order (MSB) bits are entropy encoded, and the low-order bits, the so-called residual-bits, are almost directly represented as is in the codestream. In JPEG XR entropy coding of the (Most Significant Bits) MSBs of coefficients works similar to JPEG by scanning the coefficients in well-defined order where both run-length and amplitude of the non-zero coefficients are combined into a single symbol, which is then Huffman-coded. Unlike JPEG, however, the scan order is adapted dynamically by a move-to-front list, i.e. coefficients that are often found non-zero are advanced to the start of the scan. To this end, the encoder keeps two arrays, scan[ ] and total[ ], where the [ ] are used to represent a set of array elements. The first scan array, scan [ ], includes the scan order, and the second array total [ ], includes the total number of non-zero coefficients found at the given scan position. Whenever total[k+1]>total[k], the relative order of the k-th and k+1 coefficient are interchanged. Another difference is that the Huffman back-end adjusts itself dynamically by switching between several available code-books. The available code-books are, however, static and defined by the specifications. Other smaller details between JPEG and JPEG XR differ in how the run-length code is constructed, but these differences are not important to the present invention.

The performance of an image compression codec is often determined by measuring image quality, as defined by an image metric, and the data rate of the final output stream which in many cases is defined as the average number of bits spent per pixel, e.g., the average number of bits used to represent each individual pixel of a coded image. A superior code achieves a higher quality at given rate, or a smaller rate for a given quality threshold. Traditionally, the mean-square error (MSE) between original and reconstructed image has often been used as a simple, but mathematically tractable metric, but MSE is also known for its less than perfect correlation to human quality perception.

More elaborate metrics address known effects of the human visual system. A first effect of the human visual system often taken into consideration is that the human eye is more sensitive to lower and medium spatial frequencies than to high frequencies. This is often expressed in terms of a contrast-sensitivity function (CSF). A second effect of the visual human system is that, a structure overlayed by a texture is less visible than the structure alone. This effect is generally known as visual masking. A third consideration is that the human eye is more sensitive to luminance changes than to chrominance errors. Other effects are also know but what should be appreciated is that the perceived visual quality of an image may differ significantly from a mathematically based quality metric such as the MSE metric which, while convenient to use, does not take into consideration the full effects of the human visual system.

While JPEG XR provides good statistical results on various image tests such as the MSE metric, there is a need for methods and/or apparatus which allow for image encoding to be implemented using JPEG XR or similar image encoding techniques but in a manner that provides visually superior results to those previously achieved while achieving the same or similar image compression results as have been achieved with the previously used approaches for image encoding.

SUMMARY

Methods and apparatus for performing image encoding are described.

The methods can be used to improve the visual performance of JPEG XR or other similar encoders. The resulting data stream can be decoded in a conventional manner.

In accordance with one aspect, insignificant coefficients are identified and modified to achieve a decrease in the data rate by improving entropy coding.

Various features of the present invention can be used alone or in combination, to provide an improved method of encoding images. By using the features in combination, in many cases, visual results can be improved as compared to known encoding methods with little or no increase in the amount of data required to represent an image in encoded form.

Numerous additional features, benefits and embodiments are discussed in the detailed description which follows.

BRIEF DESCRIPTION OF THE FIGURES

FIG. 5-7 illustrate exemplary tables showing examples of thresholds that can be used for one or more steps shown in FIG. 3.

DETAILED DESCRIPTION

Figure 1:
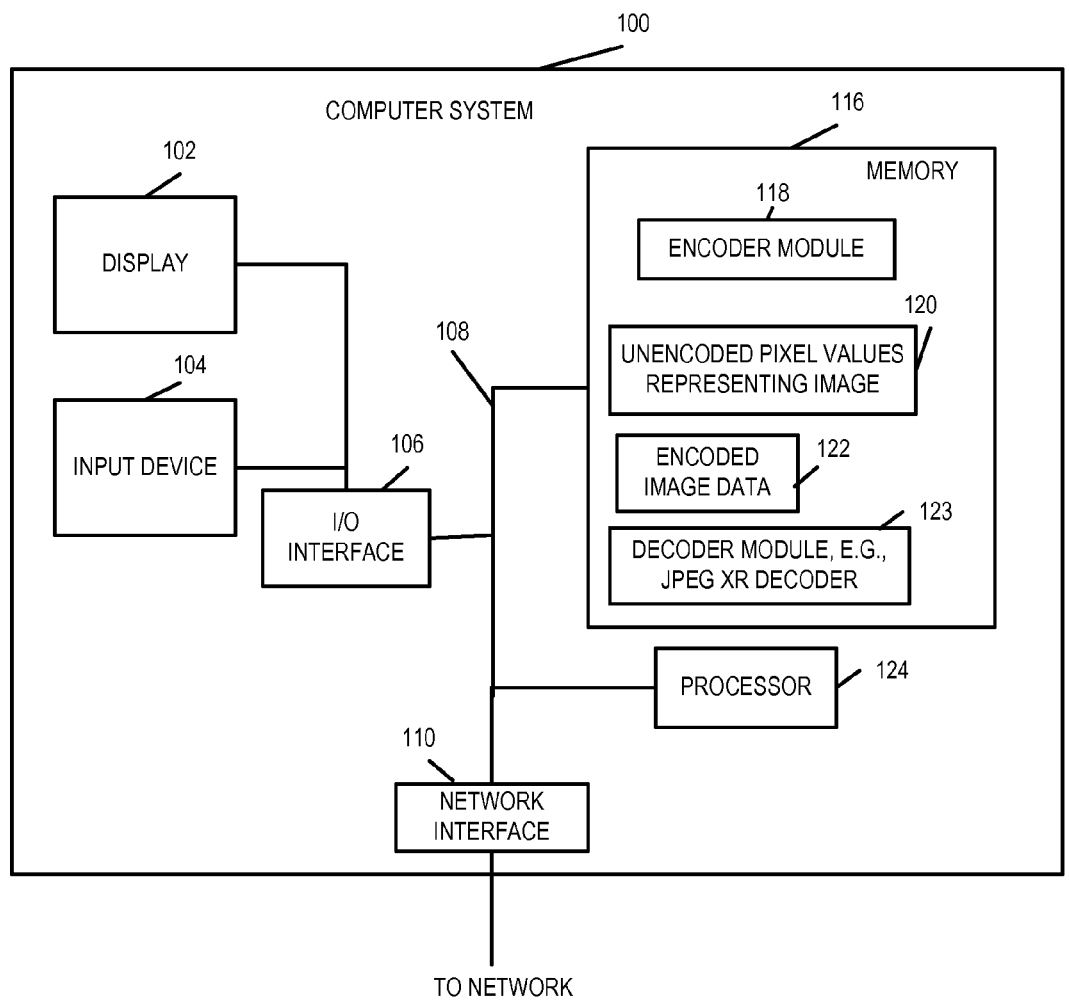
FIG. 1 illustrates an exemplary system for performing image encoding in accordance with the present invention.

Methods and apparatus for performing encoding using improved techniques are described. The methods differ somewhat from the know JPEG XR encoding method but, while still creating a JPEG XR compliant stream, provide improved visual results if compared to the compression result obtained from a conventional JPEG XR decoder at the same output rate.

The discrepancy between the generally favorable encoding results of JPEG XR when measured using the MSE metric compared to the actual somewhat disappointing visual performance of JPEG XR can be explained, at least in part, by the known bad correlation of MSE to humanly perceived image quality. Since the JPEG XR transformation is orthogonal, the MSE in the image and in the transformation domain are identical, and frequency-independent quantization in the latter domain ensures minimal mean square errors in the image domain. However, unlike MSE, the human visual system is frequency dependent, as described by the contrast sensitivity function. The methods and apparatus of the present invention exploit the frequency dependent nature of human perception to improve image quality for a given coding rate and/or to achieve a higher level of data efficiency while providing a desired level of visual quality than is achieved by using the standard JPEG XR encoding approach.

Unfortunately, JPEG XR lacks the ability to fine tune the quantization process similar to JPEG or JPEG 2000. JPEG XR only defines one common quantization parameter for all 15 AC coefficients, another one for all 15 LP coefficients and a third for the DC coefficient. Modifying one of the three parameters alone is not sufficient to obtain a significant improvement. Table 1 500 shown in FIG. 5 show the maximal allowable error to move AC coefficients into zero outside of a run and within a run (from left to right).

A more fruitful approach to improve coding efficiency of the entropy coder is by modifying the output of the quantizer and making it more favorable for subsequent processing by the run-length coder. That is symbols, in accordance with one feature of the invention, e.g., values, that are determined to be visually unimportant, e.g., insignificant, and which interrupt a run of zeros are set to zero. To this end, in one particular exemplary embodiment an encoder keeps matrices, e.g., tables, indexed by the spatial frequency the corresponding coefficient position represents.

The first table includes the maximal allowable amplitude to set a symbol to zero outside of a zero run, and by that to start a new run. The second table contains the maximal amplitude to zero a coefficient within a run, see table 2 shown in FIG. 6.

In some but not necessarily all embodiments, an additional improvement is obtained by noting that the codes for symbols ±1 are significantly shorter than those for higher amplitudes. Even if a symbol is too large to be set to zero because such a change might be visually significant, it may, and in some cases is, still eligible to be modified to a value of plus or minus one (±1) which can result in improved coding efficiency with little effect on the image quality.

Since only 1/16th of all symbols are low-pass or DC coefficients, modifying those coefficients offers less advantage than modifying high frequency coefficients due to the low-pass or DC coefficients significantly smaller impact on the coding efficiency. Accordingly, in various embodiments described herein low pass and DC coefficients are processed in a conventional manner with the encoding enhancements described herein focusing mainly on the high pass coefficients.

The proposed encoding method can provide improved image encoding results in many cases, as compared to the known JPEG XR method, when the resulting image quality is measured using the M-SSIM and the VDP metrics. According to the measurements in various tests which were performed, the visual quality reached by the enhanced encoder described herein is close to, or exceeds the quality of traditional JPEG for many different images particularly for bit rates below or equal to 2.5 bits per pixel.

FIG. 1 illustrates a computer system 100 for processing image data implemented in accordance with one embodiment of the present invention. The computer system 100 includes a display device 102, input device 104, memory 116, processor 124, I/O interface 106, and network interface 110. The display device 102 may be used, e.g., to display images resulting from processing implemented in accordance with the present invention. Input device 104 may be, e.g. a keyboard or other user input device. The display and input device are coupled to a bus 108 by I/O interface 106. The bus 108 is also coupled to the memory 116, processor 124 and network interface 110. The network interface 110 couples the internal components of the system 100 to an external network, e.g., the Internet, thereby allowing the system 100 to receive and send image data over a network. The processor 124 controls operation of the computer system 100 under direction of software modules and/or routines stored in the memory 116. Memory 116 includes unencoded pixel values representing image 120, encoded image data 122, a decoder module 123, and at least one encoder module 118 which includes a software routine, e.g., machine executable instructions, for implementing one or more of the image processing methods of the present invention. For example, encoder module 118 may control the computer system to encode an image in accordance with encoding portion of the method shown in FIG. 4. When executed by processor 124, the encoder module 118 controls the processor 124 to encode at least some of the image data in accordance with a method of the present invention. The resulting encoded image data 122 is stored in memory 116 for future use and/or communicated to another device. The encoded image data may be retrieved from storage, decoded and displayed or printed. Alternatively the encoded image data may be transmitted to another device in encoded form for decoding and display. The encoded image may be an image of an actual physical object, e.g., an image captured by a camera or scanner, or may be a computer generated image, e.g., an image generated by a human artist using a computer as an image generation tool, e.g., a drawing or photo editing tool.

Figure 2:
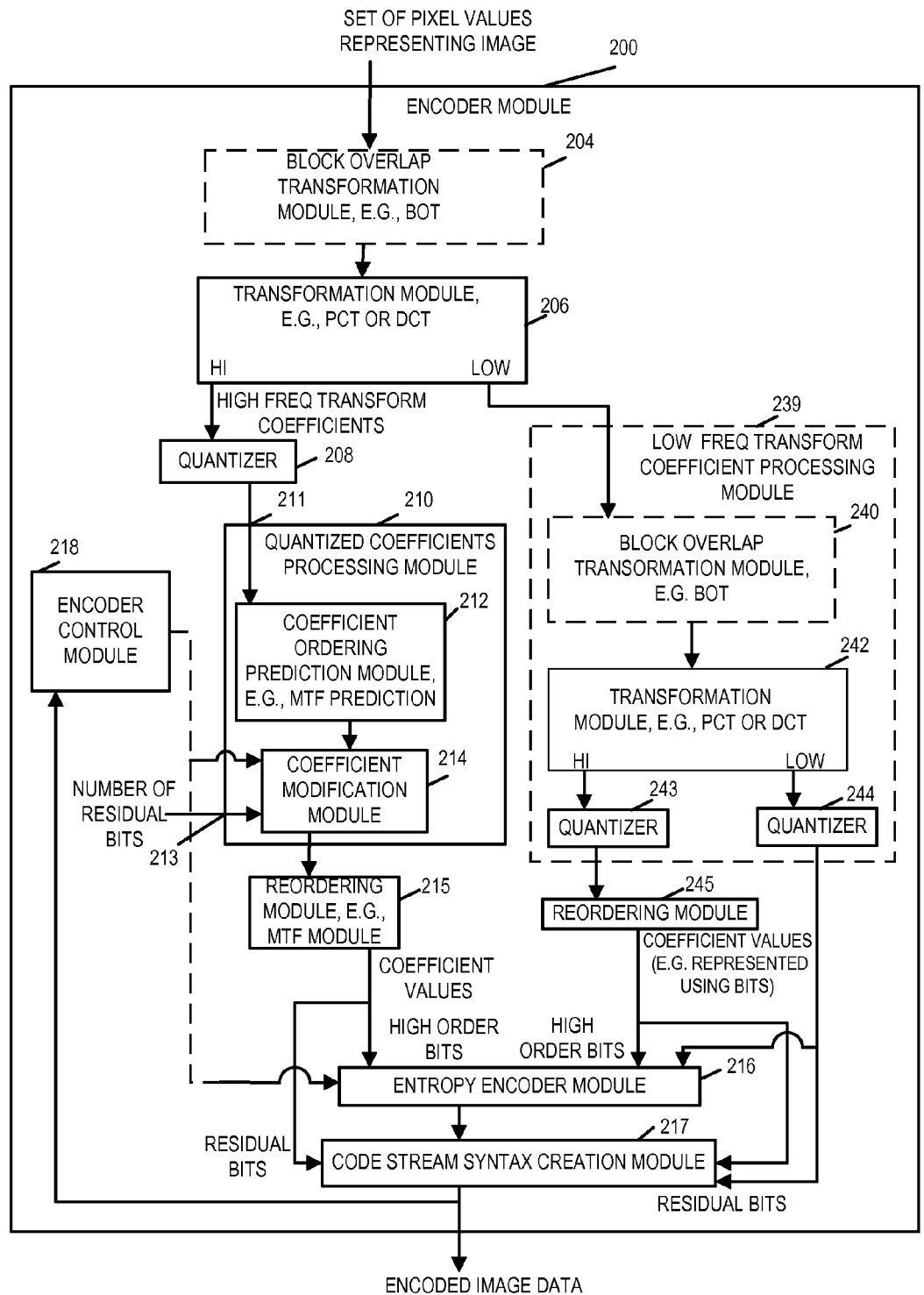
FIG. 2 illustrates an encoder module which may be used in the system of FIG. 1.

FIG. 2 illustrates an exemplary encoder module which may be used as the encoder module 118 of the system shown in FIG. 1. The encoder module 200 receives pixel values representing an image. The pixel valves may be processed by an optional block overlap transformation module, e.g., a BOT module, prior to being supplied to transformation module 206. Alternatively, the block transformation module 204 may be omitted and the input may be supplied directly to the transformation module 206. Decorrelation transform module 206 performs a block based decorrelation operation on the received pixel values, e.g, a DCT (Discrete Cosine Transform) or PCT (Photo Core Transform) operation. The HI frequency coefficients generated by decorrelation module are supplied to the quantizer 208 and the low frequency coefficients are supplied to the low frequency coefficient processing module 239. Thus, at this stage of processing the HI and LOW frequency coefficients are processed on different parallel paths, e.g., on a block by block basis.

The HI frequency coefficients from module 206 are supplied to quantizer 208 while the low frequency coefficients are supplied directly to low frequency coefficient processing module 239. Low frequency coefficient processing may be implemented by the low frequency processing module 239 in a manner which is the same or similar to the manner in which such coefficients are normally processed in JPEG XR. The low frequency coefficient processing module includes a transform module 242 which performs an additional transform on the received coefficients, e.g., a PCT or DCT transform. Optionally a block overlap transformation module 240 may be included in module 239 immediately prior to the transformation module 242. The HI and LO frequency coefficients generated by the transform performed by module 242 are supplied to individual quantizers 243 and 244 respectively. The HI frequency quantized coefficients output by the quantizer 243 of the low frequency coefficient processing module 239 are supplied as an input to the reordering module 245 which performs a coefficient reordering operation, e.g., a move to front operation. The high order bits of the Hi frequency coefficients, output by the reordering module 245, are supplied as input to an entropy encoder module 216 while the residual bits of the coefficients are supplied directly to the code stream syntax creation module 217. In a similar fashion the coefficients output of the quantizer 244 have their high order bits supplied to the entropy encoder module 216 and residual bits supplied to the code stream syntax creation module 217.

Processing of the high frequency coefficients generated by the first transformation module 206 will now be discussed.

Quantizer module 208 receives the high frequency coefficients from the first transformation module 206 and subjects them to a quantization operation under control of encoder control module 218. Quantizer 208 may be implemented using a standard quantizer such as the one used in the known JPEG XR encoding method and/or another similar type of quantizer. The quantized transform coefficient values generated by the quantizer 208 are subjected to processing by the novel quantized coefficient processing module 210 of the present invention and generates quantized transform coefficient values which are supplied as input to the quantized coefficient processing module 210 which operates in accordance with the invention. The module 210 includes an input 211 for receiving the quantized values, an encoder setting input 213 for receiving an input indicating the number of residual bits being used per coefficient. The quantized coefficients processing module 210 subjects the received coefficients to a selective modification processes with the processed values being modified depending on their values and/ or the residual bit control setting in embodiments where residual bits are supported as part of the encoding process, e.g., as is the case in JPEG XR compatible encoding. Residual bits are a number of lower order bits of a transform coefficient which are not to be subjected to entropy coding. The higher order bits, e.g., the bits of a coefficient other then the residual bits, are normally subject to entropy coding. The residual bits and entropy coded bits corresponding to a coefficient are communicated in the same encoded set of data created by the image encoding process.

As part of the processing performed by the quantized coefficient processing module 210, a coefficient ordering prediction module 212 performs a predication regarding how the received coefficients will be reordered prior to entropy coding. The module 212 may perform a move to front (MTF) prediction where such reordering is implemented, e.g., in JPEG XR compatible implementations. The coefficients along with information indicating the predicted coefficient reordering are supplied to coefficient modification module 214. Coefficient modification module 214 analyzes the coefficients taking into consideration the reordering predications. In some embodiments, non-zero coefficient values which interrupt a run of zero values, which will occur if the predicted coefficient reordering occurs, are identified. A determination is made as to whether setting the coefficient interrupting the run of zero coefficients to zero will result in an insignificant and/or imperceptible change in image quality. If the effect of zeroing the coefficient is determined to be insignificant or not perceptible the examined coefficient is selected for modification and set to zero. Normally at least one coefficient within an image will be set to zero in step 214. Zeroing a coefficient in this manner increases the length of a predicted zero run resulting in more efficient coding as the longer zero run makes run length coding of the zero run more efficient, e.g., due to the increased length of the zero run to be coded.

Other coefficient modifications may be made by module 214 as well. For example, one or more non-zero coefficients may be set to +1 or −1 with little or not effect on the perceivable image quality in accordance with various embodiments but with improvements in overall coding efficiency being achieved as the result of the more efficient coding of the +1 or −1 value as opposed to another non-zero value.

FIG. 3 which will be discussed below illustrates the steps of a coefficient modification method which may be implemented by module 214. However other coefficient modification methods which take advantage of the predicted coefficient ordering information generated by module 212 may be used in alternative embodiments.

Following coefficient modification by module 214 the modified set of coefficients is supplied to the reordering module 215. The reordering module 215 performs a coefficient reordering operation, e.g., a move to front operation. This may be implemented by using the standard JPEG XR MTF operation or another coefficient reordering operation depending on the particular embodiment. Note that the coefficient ordering prediction module 212 takes into consideration the expected coefficient reordering to be performed by module 215 when making the ordering predictions. However, it should be noted that the final coefficient ordering will be affected by any coefficient modifications made by module 214 and therefore the final coefficient ordering may not precisely match the ordering predicted by module 212 however the prediction serves as a reasonable basis upon which to predict the likely effect of a coefficient modification.

Coefficients are represented as values. Accordingly, the individual coefficients output by the reordering module 215 each include a plurality of bits. The bits of each coefficient which are intentionally not subjected to entropy encoding are referred to as residual bits. These are the low order bits of the individual coefficient values with the number of residual bits input to the encoder module indicating how many of the low order bits of a coefficient value are to be treated as residual bits. The remaining higher order bits of each coefficient value, i.e., the non-residual bits, are subjected to entropy encoding along with the low frequency coefficient values output by the low frequency coefficient processing module 239. The entropy encoder module 216, in a JPEG XR compatible embodiment, uses standard JPEG XR entropy encoding.

The entropy encoded coefficient data output of the entropy encoder module 216 is supplied to a code stream syntax creation module 217 which also receives the coefficient residual bits output by the reordering module 215. The codestream syntax creation module 217 adds syntax and framing information which facilies proper identification of image data and compliance with the syntax of the encoding standard with which the encoder module seeks to comply, e.g., the syntax of the JPEG XR standard in some embodiments.

Information on the data rate of the encoded data stream generated by code stream syntax creation module is feed back to the encoder control module 218 allowing the encoder control module to adjust the entropy encoder module 216.

In some embodiments encoder control module 218 alters various encoder settings so that the encoder module 216 operates in accordance with the invention.

Depending on the input image, in some cases, the encoder control module 218 controls the quantizer 208, on a block or other image portion basis, to use fine quantization levels and controls the coefficient modification module 214 so that some non-zero quantized transform values are intentionally forced to zero, e.g., to facilitate subsequent entropy encoding. However, for other images, e.g., based on image content, the encoder control module 218 may use larger quantization bins, e.g., fewer levels, but not have the coefficient modification module 214 force some coefficients to zero. In still other embodiments, the quantized coefficient processing module 210 is used on each of the images with the potential, depending on the coefficient values, for the transform coefficients to be forced to zero.

Figure 3A:
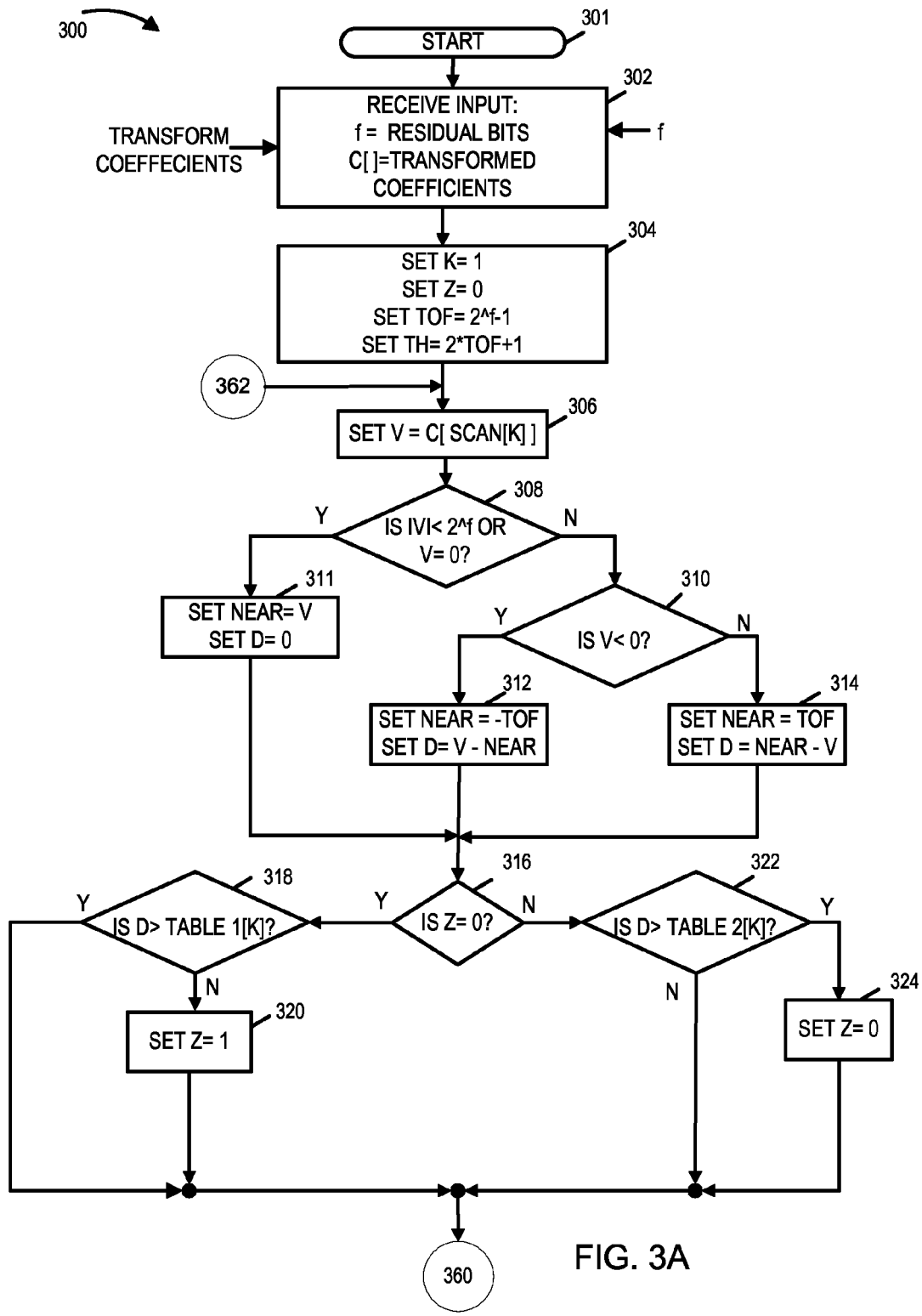
FIG. 3 illustrates the steps of an exemplary coefficient modification method which may be implemented by the encoder module of FIG. 3.

FIG. 3, which comprises the combination of FIGS. 3A and 3B is a flow chart showing processing steps of a coefficient modification method 300 which is implemented, in some embodiments, by the coefficient modification module 214 shown in FIG. 2.

The input to the method 300 are the quantized transform coefficients from the quantizer 208 and, in embodiments where a residual bits input is used, a residual bits input f, and scan order information predicated by the coefficient ordering predication module 212. The value f, is a control value which can be used to control to what values entropy encoding is applied in step 216. In cases where the concept of residual bits such as those supported in JPEG XR are not supported, the control value f may be treated as zero indicating the absence of residual bits.

FIG. 3 illustrates the steps of a coefficient modification method which may be implemented by module 214.

Start step 301 represents the start of the coefficient modification method. In step 302, input data is received. The value f indicates the number of residual bits per coefficient and is an encoder setting under control of the encoder control module and/or other settings. The value f may vary during the processing of an image but remains fixed within a block of coefficients. C[ ] is the set of coefficients to be processed ordered according to the reordering prediction made by coefficient ordering prediction module 212. For example, the set of coefficients may include coefficients C[1] to C[15]. A variable k is used to indicate the index of the coefficient being processed. For example if K=2, C[K] refers to coefficient C[2].

With the input having been received in step 302, operation proceeds to step 304 wherein various variable are initialized. In step 304 K is set to 1, Z is set to 0, TOF is set to 2 raised to the power of f−1 and TH is set to 2 raised to the power of TOF+1. Z is a flag that is used to indicate whether a coefficient being processed is in a run of zeros. If Z=1 it indicates the coefficient is in a run of zeros while a 0 indicates the coefficient is not in a run of zeros. TOF is an value based on an offset shift from the edge of a quantization bin to a reconstruction point, e.g., center of the bin. TOF may be determined from the # f of residual bits. TH is a quantization bin threshold used to determine the range of values (+/−TH) which correspond to a quantization bin.

Steps 346 to 348 represent a processing loop used to process coefficients one by one. In step 306, the variable V is set to the value the coefficient C[scan[K]], where K is the index into the scan order being used and from the utilized scan order the coefficient in the input sequence is selected. That is scan [K] returns a number and the number is used as the index into the coefficient set c[ ] to determine the coefficient to be used, i.e., to set the value V. Operation proceeds from step 306 to step 308 in which the absolute value of the current coefficient is checked to see if it is less that 2 raised to the power for if V is set to zero. If the check in step 308 results in a yes, then it indicates that the coefficient is part of a 0 run. If the check in 308 results in a no, the coefficient is corresponds to a +1, −1 bin or something else. If the coefficient being processed is part of the zero run, we move to step 311 and set the variable NEAR to V and set D to zero. NEAR represents the coefficient value to be modified while D represents a measure of distortion that may be introduced into the image by the modification. D is set to 0 initially indicating no introduced distortion since no modification has been made yet. Operation proceeds from step 311 to step 316.

Referring once again to step 308, if in step 308 if the decision is a NO, operation proceeds to step 310. In step 310, V is checked to determine if the coefficient being processed is less than 0. If V is less than 0 operation proceeds to step 312 otherwise to step 314. In step 312 NEAR is set to −TOF and D is updated to be equal to V−NEAR. However, if operation proceeded to step 314, NEAR is set to TOF and D is set equal to NEAR−V. The updates of D in steps 312, 314 is to reflect the distortion which will be introduced into the image by modifying the coefficient represented by the variable NEAR as done in steps 312, 314, respectively. Operation proceeds from steps 312, 314 to step 316.

In step 316 a determination is made if Z=0, i.e., if a coefficient corresponding to a zero run is being processed. If the answer is yes, operation proceeds step 318. In step 318 a determination is made if the distortion indicated by the variable D which will be introduced is greater than a threshold for the coefficient which is determined from table 1 shown in FIG. 5. Note that the threshold to be used is obtained from the table based on the value of the coefficient index K. For example if K=3, the threshold for step 318 would be 2 but if K=1, the threshold used would be 0. If the determination in 318 is yes, the distortion which would be introduced by modifying the coefficient is considered to be too great and the coefficient is not altered. However, D is less than or equal to the threshold obtained from Table 1, modification of the coefficient is deemed beneficial and the coefficient will be set to 0. Accordingly, if the determination in step 318 is no, indicating that modification is beneficial, operation proceeds to step 320 where Z is set to 1 to indicate that the coefficient being processed is being modified to be part of a zero run. Operation proceeds from step 320 to step 326 via connecting node 360. If in step 316 it was determined that Z did not equal 0, indicating that the coefficient being processed was part of a zero run, operation proceeds to step 322 where a determination is made as to whether the coefficient should be modified. In step 322 D is compared to a threshold value determined from Table 2 shown in FIG. 6 based on the index K. It should be appreciated that steps 318 and 322 perform similar checks but using different tables to determine the appropriate threshold to be used for determining whether coefficient modification would be beneficial. The tables shown in FIGS. 5, 6 and 7 are exemplary. Other threshold tables may be used. The threshold included in tables 5, 6 and 7 may be empirically determined, e.g., based on test images and results of modifying the images based on the use of different thresholds.

If in step 322 it is determined that it is beneficial to modify the coefficient, operation proceeds to step 324 where Z is set to zero to indicate the coefficient will no longer be part of a zero run. However, if the coefficient is not to be modified, operation proceeds from step 322 to step 326 via connecting node 360 with Z being left unchanged, i.e., Z will remain set to 1.

In step 326, Z is checked and if it is set to 0, operation proceeds to step 330. However, if it is set to zero indicating that the coefficient is part of a zero run, operation proceeds to step 328. In step 328, the value of the coefficient having the index SCAN[k] is set to the value NEAR. This involves setting the coefficient to zero if it was not already zero but if it was zero, the value will remain zero. Thus at the end of step 328 the value of the coefficient being processed will be zero and Z will remain 1. From step 328 operation proceeds to step 348.

If in step 326 it was determined Z was set to zero indicating the coefficient being processed was not part of a zero run operation proceeds to step 330.

Step 330 represents the start of additional processing of a coefficient which does not belong to a zero run. A check of the value of the variable V is made in step 330 and if V is less than zero, it is set to −TH in step 332 while if V is not less than zero NEAR is set to TH in step 334. Operation proceeds from steps 332 or step 334 to step 336. In step 336 a check is made as to whether modification of the non-zero coefficient being processed is advantageous. The conditional check shown in step 336 is made. Note that this check uses a threshold value obtained from Table 3 shown in FIG. 7 based on the index value K. Table 3 may, and in some embodiments is, the same as Table 1 use to provide the threshold value for step 318.

If in step 336 the determination is yes, operation proceeds to step 338 where the coefficient is set to 1 by the operation set C[SCAN[K]]=NEAR. Operation proceeds to step 340 from step 338 or directly from step 336 if the determination was a no in step 336.

In step 340 the count TOTAL [K] is incremented. Total L is a count of the number of non-zero's corresponding to position [K]. In step 342 a check is made as to whether a coefficient that is scanned later in the scan order has a larger number of non-zero's than the preceding coefficient. If the determination in step 342 is a yes, operation proceeds to step 346 where the coefficient positions in the scan order and the corresponding totals between position K and K−1 are swapped.

Operation proceeds from step 342 in the case of a no determination or from step 346 to step 348 in which K is incremented. In step 350 K is then checked to determine if it is equal to the number of coefficients in the set of K coefficients being processed, e.g., to determine if there are more coefficients to be processed. If the determination in step 350 is a no, operation proceeds once again to step 306 via connecting node 362 otherwise the set of updated coefficients 354 is passed to the next processing step in the encoding process, e.g., to reordering module 215 and processing of the set of K coefficients is completed in stop step 352.

Generally steps 308 through 314 check whether the entropy-coded part of the coefficient can be set to zero, and if so, what the best possible value of the coefficient is that has the non-residual bits part set to zero. In some embodiments the residual bits can be modified to improve the approximation.

Steps 330 through 338 perform a similar function for the values +1 and −1. Again, the method tries to find the nearest possible coefficient value whose high-order (entropy-coded=non-residual-bit) value is +1 or −1, modifying the residual bits accordingly. If the error by this modification is smaller than the threshold, the modification is done (step 338).

Steps 342 through 346 are used to perform the update of the scan-order prediction.

Figure 4:
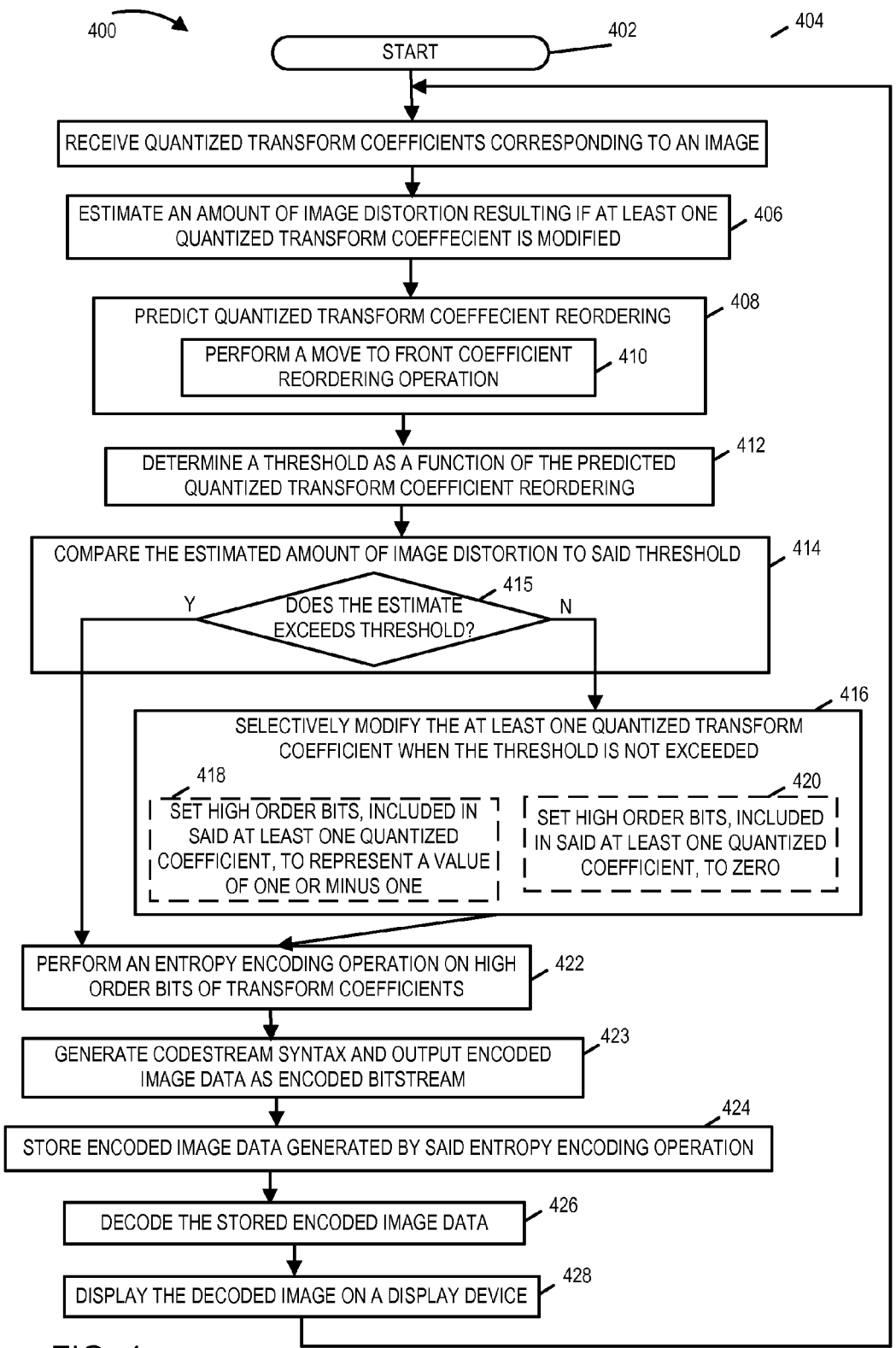
FIG. 4 is a flow chart illustrating the steps of an exemplary encoding method implemented in accordance with the present invention.

FIG. 4 is a flow chart 400 showing processing steps of an exemplary method of image processing in accordance with the present invention. The exemplary method of flowchart 400 can be implemented by the exemplary computer system 100 of FIG. 1. To facilitate understanding, the method will be discussed with reference to the operations of various elements discussed in FIGS. 2 and 3. The exemplary method starts in step 402 where the system is initialized.

Operation proceeds from start step 402 to step 404. In step 404 quantized transform coefficients corresponding to an image are received by the quantized coefficients processing module 210. In one embodiment the quantized transform coefficients corresponding to an image are provided to the processing module 210 by a quantizer such as the quantizer 208. The operation proceeds from step 404 to step 406 where an estimate of an amount of image distortion resulting if at least one quantized transform coefficient is modified. Thus in accordance with one aspect, prior to performing any modification, e.g., selective modification, amount of image distortion which may result from such a modification is estimated.

Operation proceeds from step 406 to step 408. In step 408 quantized transform coefficient reordering is predicted to predict if any quantized transform coefficient reordering may occur prior to or as part of an entropy encoding process. In some embodiments the step 408 of predicting reordering includes performing step 410 where move to front prediction. The reordering prediction step can be performed by the coefficient ordering prediction module 212 which in some embodiments includes a move to front (MTF) prediction module for performing the MTF operation as part of the reorder prediction step.

Operation proceeds from step 408 to step 412. Following the reordering prediction in the previous step, in step 412 a threshold as a function of the predicted quantized transform coefficient reordering is determined. The determined threshold is, e.g., an acceptable level image distortion which may occur as a result of at least one transform coefficient being selectively modified. The operation proceeds from step 412 to step 414 wherein the estimated amount of image distortion is compared to the determined threshold. The comparison is made to determine whether or not the estimated amount of image distortion resulting from the selective modification exceeds the threshold level. The comparison step 414 includes a determination and decision step 415 where a decision is made how to proceed based on the result of the comparison. If it is determined in step 415 that the estimated amount of image distortion does not exceed the threshold level, operation proceeds from step 414 which includes step 415, to step 416.

In step 416, the at least one quantized transform coefficient is selectively modified when the threshold is not exceeded. In accordance with one aspect if the at least one transform coefficient is selectively modified in accordance with the invention, the efficiency of entropy encoding operation to be performed on the transformed coefficient will be increased. In one embodiment the coefficient modification module 214, identifies the at least one transform coefficient which, if forced to zero or some other value, will increase entropy encoding while causing acceptable image distortion or an acceptable level of impact on the quality of the encoded image. In some embodiments the at least one quantized transform coefficient includes residual bits and high order bits. Selective modification step 416 includes, in some embodiments, two alternative optional steps 418 and 420. In step 418 high order bits are set to represent a value of one or minus one and residual bits are updated in a way that minimizes the distortion. In some embodiments the other optional step 420 is performed wherein the high order bits are set to zero and residual bits are updated in a way that minimizes the distortion.

Operation proceeds from step 416 to step 422. Following selective modification, in step 422 the entropy encoder 216 performs entropy encoding operation on the high order bits of the transform coefficients in accordance with the invention. It should be appreciated that the residual bits are not subjected to entropy encoding operation. The operation proceeds from step 422 to step 423. In step 423 codestream syntax is generated and encoded image data is output as an encoded bit stream.

Operation proceeds from step 423 to step 424. In step 424 the encoded image data generated by the entropy encoding operation, e.g., the output from the entropy encoder 216, is stored, e.g., in the memory 116.

Operation proceeds from step 424 to step 426. In step 426 the stored encoded image data is decoded. The operation proceeds from step 426 to step 428. In step 428 the decoded image is displayed on a display device. In some other embodiments the decoded image may not be displayed, rather printed or converted to some other form for use. Alternatively in some embodiments the encoded image data may be transmitted to another device in encoded form for decoding and display. Operation proceeds from step 428 back to step 404.

FIG. 5 illustrates exemplary Table 1 500, showing examples of thresholds that can be used in step 318 shown in FIG. 3.

FIG. 6 illustrates exemplary Table 2 600, showing examples of thresholds that can be used in step 322 shown in FIG. 3.

FIG. 7 illustrates another exemplary Table 3 700, showing examples of thresholds that can be used in step 336 shown in FIG. 3.

It should be appreciated that the Tables 1, 2 and 3 are presented as examples and other tables may be used in different embodiments of the invention.

The techniques of various embodiments may be implemented using software, hardware and/or a combination of software and hardware. Various embodiments are directed to apparatus, e.g., an image processing system. Various embodiments are also directed to methods, e.g., a method of encoding an image. Various embodiments are also directed to machine, e.g., computer, readable medium, e.g., ROM, RAM, CDs, hard discs, etc., which include machine readable instructions for controlling a machine to implement one or more steps of a method.

In various embodiments apparatus described herein are implemented using one or more modules to perform the steps corresponding to one or more methods. Thus, in some embodiments various features are implemented using modules. Such modules may be implemented using software, hardware or a combination of software and hardware. Many of the above described methods or method steps can be implemented using computer executable instructions, such as software, included in a computer readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a computer readable medium including computer executable instructions for causing a machine, e.g., processor and associated hardware, to perform one or more of the steps of the above-described method(s).

Some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., an image processing system.

In some embodiments modules are implemented using software, in other embodiments modules are implemented in hardware, in still other embodiments the modules are implemented using a combination of hardware and/or software.

Numerous additional variations on the methods and apparatus of the various embodiments described above will be apparent to those skilled in the art in view of the above description. Such variations are to be considered within the scope of the invention.

What is claimed is:

1. An image processing method, the method comprising:
receiving quantized transform coefficients corresponding to an image;
estimating an amount of image distortion resulting if at least one quantized transform coefficient is modified;
predicting quantized transform coefficient reordering prior to performing an entropy encoding operation;
determining a threshold as a function of the predicted quantized transform coefficient reordering;
comparing the estimated amount of image distortion to said threshold; and
selectively modifying said at least one quantized transform coefficient value when said threshold is not exceeded.

2. The image processing method of claim 1,
wherein said at least one individual quantized transform coefficient includes residual bits and high order bits; and
wherein said selectively modifying said at least one quantized transform coefficient includes setting the high order bits to zero.

3. The method of claim 1, wherein said step of selectively modifying performs a modification based on a value of the quantized transform coefficient being processed.

4. The method of claim 3, wherein said step of selectively modifying performs said modification also based on a setting of a residual bits encoder control value.

5. The method of claim 3, further comprising:
storing encoded image data generated by said entropy encoding operation;
decoding said stored encoded image data; and
displaying the decoded image on a display device.

6. The method of claim 3, further comprising:
performing said entropy encoding operation on transform coefficients following said selective modification operation.

7. The method of claim 1, wherein predicting quantized transform coefficient reordering includes performing a move to front coefficient reordering operation.

8. The method of claim 7, wherein said at least one individual transform coefficient is a coefficient in a run of zero coefficients in the order predicted by said step of predicting quantized transform coefficient reordering, coefficients which are not in a run of zero coefficients not being subject to selective modification.

9. The method of claim 8 wherein said entropy encoding operation is a variable length coding operation.

10. An image processing method, the method comprising:
receiving quantized transform coefficients corresponding to an image;
estimating an amount of image distortion resulting if at least one s quantized transform coefficient is modified;
comparing the estimated amount of image distortion to a threshold; and
selectively modifying said at least one quantized transform coefficient value when said threshold is not exceeded;
wherein said at least one individual quantized transform coefficient includes residual bits and high order bits; and
wherein said selectively modifying said at least one quantized transform coefficient includes setting the high order bits to represent a value of: one or minus one.

11. An image processing system, comprising:
means for receiving quantized transform coefficients corresponding to an image;
means for predicting quantized transform coefficient reordering; and
means for selectively modifying quantized transform coefficients based on the predicted quantized transform coefficient reordering.

12. The system of claim 11, wherein said means for selectively modifying include means for setting at least one quantized transform coefficient value to zero.

13. The system of claim 12, wherein said selective modification is based on a value of the quantized transform coefficient being processed.

14. The system of claim 13, wherein said selective modification is also based on a setting of a residual bits encoder control value.

15. The system of claim 13, further comprising:
means for performing an entropy encoding operation on transform coefficients following said selective modification operation.

16. The system of claim 12, wherein said means for predicting quantized transform coefficients reordering includes means for performing a move to front coefficient recording operation.

17. The system of claim 12, further comprising:
a data storage device for storing encoded image data generated by said entropy encoding operation.

18. The system of claim 17, further comprising:
means for decoding said stored encoded image data; and
means for displaying the decoded image on a display device.

19. A non-transitory computer readable medium embodying computer readable instructions for controlling an image processing apparatus, the non-transitory computer readable medium comprising:
instructions for causing said apparatus to receive quantized transform coefficients corresponding to an image;
instructions for causing said apparatus to estimate an amount of image distortion resulting if at least one quantized transform coefficient is modified;
instructions for causing said apparatus to predict quantized transform coefficient reordering prior to performing an entropy encoding operation;
instructions for causing said apparatus to determine a threshold as a function of the predicted quantized transform coefficient reordering;
instructions for causing said apparatus to compare the estimated amount of image distortion to said threshold; and
instructions for causing said apparatus to selectively modify said at least one quantized transform coefficient value when said threshold is not exceeded.

* * * * *